(12) United States Patent
Henry et al.

(10) Patent No.: US 10,841,762 B2
(45) Date of Patent: Nov. 17, 2020

(54) MOBILE DATA DYNAMIC GROUPING FOR CONNECTED VEHICLE AND IN-VEHICLE NETWORKING

(71) Applicant: Cisco Technology, Inc., San Jose, CA (US)

(72) Inventors: Jerome Henry, Pittsboro, NC (US); Robert Edgar Barton, Richmond (CA); John George Apostolopoulos, Palo Alto, CA (US); John Martin Graybeal, Califon, NJ (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 16/293,245

(22) Filed: Mar. 5, 2019

(65) Prior Publication Data

US 2020/0288374 A1 Sep. 10, 2020

(51) Int. Cl.
*H04W 4/46* (2018.01)
*H04W 40/20* (2009.01)
*H04W 40/02* (2009.01)
*H04L 29/08* (2006.01)
*G05D 1/02* (2020.01)
*G05D 1/00* (2006.01)

(52) U.S. Cl.
CPC ............ *H04W 4/46* (2018.02); *G05D 1/0027* (2013.01); *G05D 1/0295* (2013.01); *H04L 67/18* (2013.01); *H04W 40/026* (2013.01); *H04W 40/20* (2013.01)

(58) Field of Classification Search
CPC ..................................................... H04W 4/46
See application file for complete search history.

(56) References Cited

U.S. PATENT DOCUMENTS

| | | | |
|---|---|---|---|
| 10,341,931 | B1 | 7/2019 | Apostolopoulos et al. |
| 2001/0044898 | A1 | 11/2001 | Benussi et al. |
| 2003/0060216 | A1 | 3/2003 | Kamel et al. |
| 2014/0159923 | A1 | 6/2014 | Koodli et al. |
| 2016/0309524 | A1* | 10/2016 | Barreto De Miranda Sargento .... H04W 76/10 |

(Continued)

FOREIGN PATENT DOCUMENTS

JP 11196446 7/1999

OTHER PUBLICATIONS

Ibrahim, et al., "CASCADE: Cluster-based Accurate Syntactic Compression of Aggregated Data in VANETs", 2008 IEEE Globecom Workshops, pp. 1-10, 2008, IEEE.

(Continued)

*Primary Examiner* — Jason E Mattis
(74) *Attorney, Agent, or Firm* — Behmke Innovation Group LLC; James M. Behmke; James J. Wong (57) ABSTRACT

In one embodiment, a technique for information sharing among dynamically grouped vehicles is provided that illustratively comprises making, by a first vehicle of a first plurality of vehicles, a determination that the first plurality of vehicles is a convoy of vehicles traveling as a group; sending, by the first vehicle, a group identifier that is indicative of the convoy and of each of the plurality of vehicles to an access point in communication with the first vehicle; authenticating, by the first vehicle, with the access point using the group identifier; and exchanging, by the first vehicle, first vehicular data with the access point using a first connection of a plurality of connections assigned to the group identifier.

20 Claims, 8 Drawing Sheets

(56) References Cited

U.S. PATENT DOCUMENTS

| | | | |
|---|---|---|---|
| 2018/0278385 A1* | 9/2018 | Wu | G08G 1/22 |
| 2019/0051158 A1* | 2/2019 | Felip Leon | G08G 1/096783 |
| 2019/0158408 A1* | 5/2019 | Li | H04L 67/104 |
| 2019/0274017 A1* | 9/2019 | Wang | H04W 4/06 |
| 2019/0296919 A1* | 9/2019 | Kravitz | H04W 12/08 |
| 2019/0306678 A1* | 10/2019 | Byun | H04L 5/0055 |
| 2020/0021451 A1* | 1/2020 | Pinheiro | H04W 76/45 |

OTHER PUBLICATIONS

Jiang, et al., "IEEE 802.11p: Towards an International Standard for Wireless Access in Vehicular Environments", VTC Spring 2008—IEEE Vehicular Technology Conference, pp. 2036-2040, 2008, IEEE.

Khan, et al., "A Group Based Key Sharing and Management Algorithm for Vehicular Ad Hoc Networks", The Scientific World Journal, vol. 2014, Article ID 740216, 8 pages, 2014, Hindawi Publishing Corporation.

\* cited by examiner

MOBILE DATA DYNAMIC GROUPING FOR CONNECTED VEHICLE AND IN-VEHICLE NETWORKING

TECHNICAL FIELD

The present disclosure relates generally to computer networks, and, more particularly, to mobile data dynamic grouping for connected vehicle and in-vehicle networking.

BACKGROUND

Many vehicles, such as automobiles, are becoming increasingly sophisticated in terms of on-board sensors, sensor data processing, and overall vehicle capabilities. For example, autonomous vehicles, also sometimes referred to as self-driving cars, may leverage complex sensors and data processing techniques, such as to route the vehicles to their destinations and avoid roadway hazards. Trials of autonomous vehicles are now being conducted in many cities.

With the increasing computerization of vehicles also comes an increasing push to connect vehicles to other systems (V2X). For example, vehicle-to-vehicle (V2V) communications allows nearby vehicles to share data between one another, such as detected hazards, coordinating platoons of autonomous vehicles that travel together in unison, and the like. Similarly, vehicle-to-infrastructure (V2I) communications allow vehicles to communicate with existing computer networks, such as the Internet. Current communications standards fall short of meeting the communication constraints posed by the emerging applications, such as fast-moving vehicles attempting to receive and/or send large data volumes from transient high-throughput connection points.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, techniques herein provide for information sharing among dynamically grouped vehicles. The techniques may illustratively comprise making, by a first vehicle of a first plurality of vehicles, a determination that the first plurality of vehicles is a convoy of vehicles traveling as a group; sending, by the first vehicle, a group identifier that is indicative of the convoy and of each of the plurality of vehicles to an access point in communication with the first vehicle; authenticating, by the first vehicle, with the access point using the group identifier; and exchanging, by the first vehicle, first vehicular data with the access point using a first connection of a plurality of connections assigned to the group identifier.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating and air-conditioning (HVAC), windows and window shades and blinds, doors, locks, etc. The "Internet of Things" thus generally refers to the interconnection of objects (e.g., smart objects), such as sensors and actuators, over a computer network (e.g., via Internet Protocol (IP)), which may be the public Internet or a private network.

Often, IoT networks operate within a shared-media mesh network, such as wireless or PLC networks, etc., and are often on what is referred to as Low-Power and Lossy Networks (LLNs), which are a class of networks in which both the routers and their interconnects are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to IoT endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer (P2P) configuration.

Figure 1A:
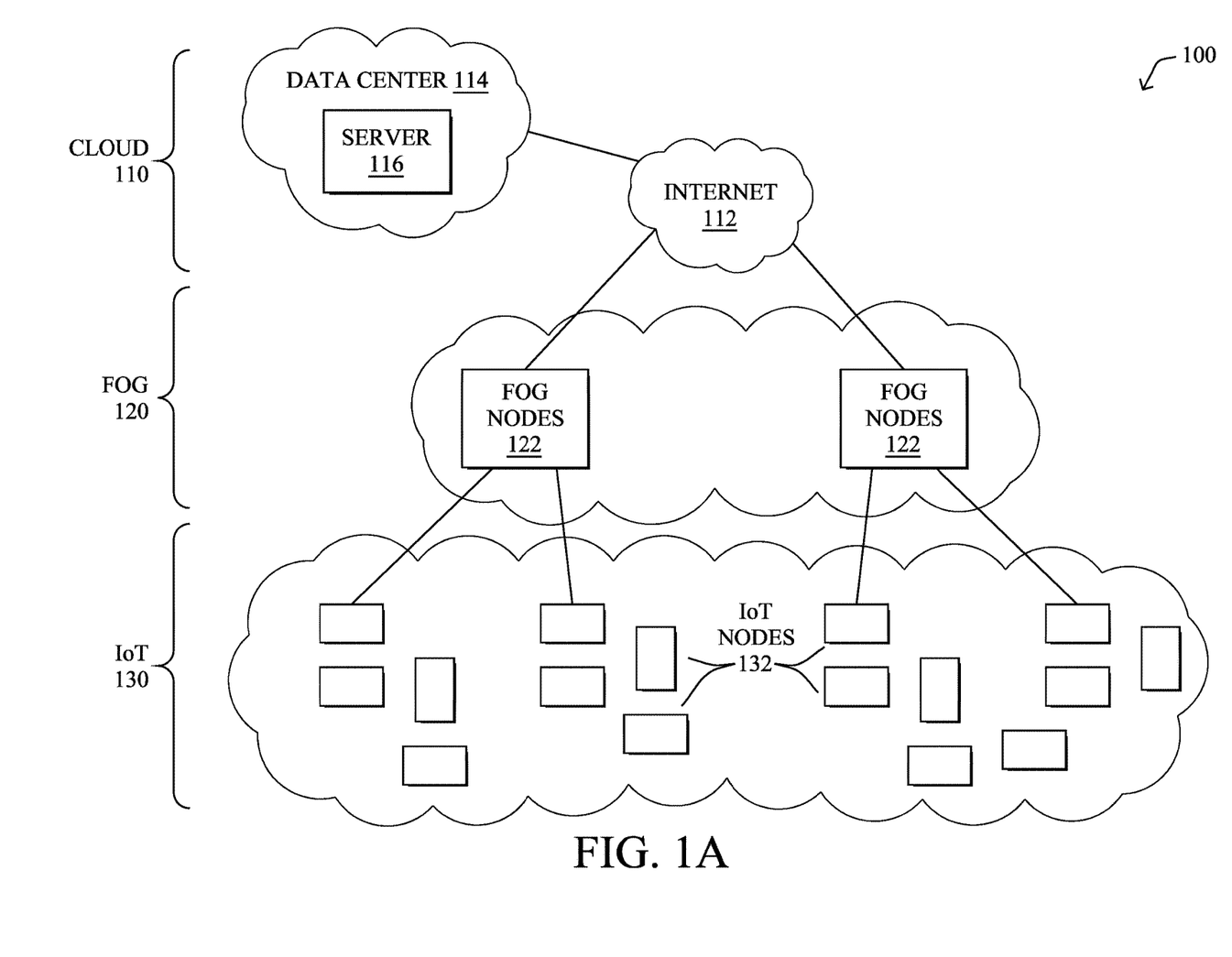
FIGS. 1A-1B illustrate an example communication network.

FIG. 1A is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, Power Line Communications (PLC) protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 1B:
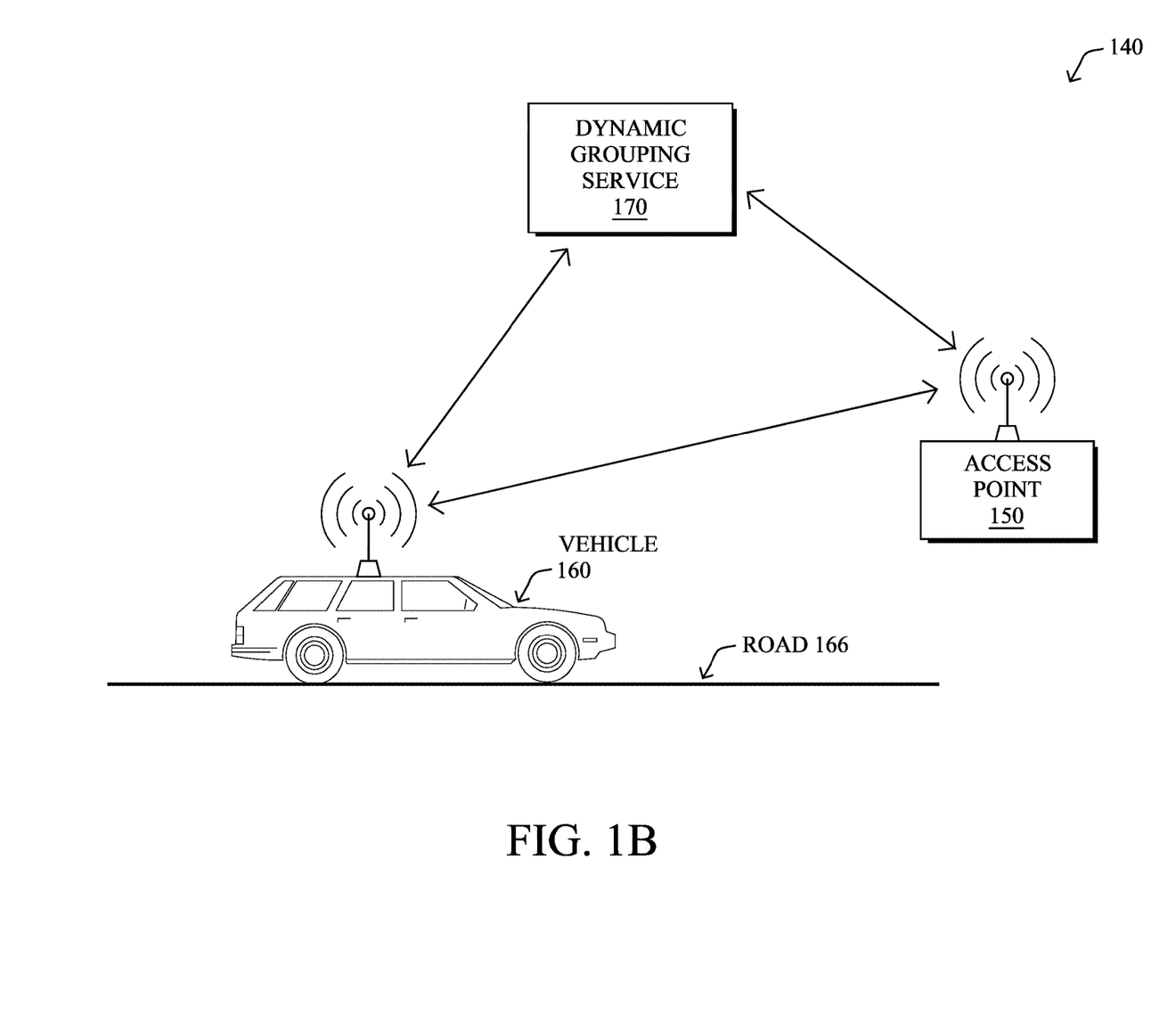

As a specific illustration of a certain type of IoT network, FIG. 1B illustrates an example connected vehicle system 140, according to various embodiments. In particular, connected vehicle system 140 may include any or all of the following components: a vehicle 160 on a road 166, an access point 150, and/or a dynamic grouping service 170. During operation, connected vehicle system 140 may be operable to interface vehicle 160 with a backend computer network, such as the Internet, to which dynamic grouping service 170 belongs.

In some embodiments, connected vehicle system 140 may be a specific implementation of communication network 100. Notably, dynamic grouping service 170 may be implemented at the cloud layer 110, such as at a particular server 116 in a data center 114 or, alternatively, across multiple servers 116, such as part of a cloud-based service. Similarly, access point 150 may be a fog node 122 at fog computing layer 120, while vehicle 160 may be viewed as an IoT node 132 at IoT layer 130. Thus, vehicle 160 may communicate directly with access point 150, and/or via other IoT nodes 132 (e.g., other vehicles, roadside sensors, etc.), and access point 150 may provide some degree of processing or storage over the communicated data.

Generally, as shown, vehicle 160 may be an automobile, motorcycle, truck, aircraft, autonomous drone, or any other type of vehicle configured to communicate via connected vehicle system 140. In some embodiments, vehicle 160 may be a fully autonomous vehicle or a semi-autonomous vehicle that allows a driver to exert control over vehicle 160, as desired.

The access point 150 may be configured to allocate communicate with dynamic grouping service 170 via a WAN, such as the Internet 112 or another WAN. For example, access point 150 may communicate with dynamic grouping service 170 by leveraging a hardwired network connection, cellular or other wireless connection, satellite connection, or the like. Communications between vehicle 160 and access point 150 may generally be wireless and use any form of known wireless communication (e.g., Wi-Fi, cellular, light-based, etc.). More specifically, access point 150 may be part of a radio access network that provides wireless connectivity between a backbone network and vehicle 160.

In one embodiment, the access point 150 may illustratively communicate with the vehicle 160 in accordance with IEEE 802.11 communication standards. In particular, the access point 150 and the vehicle 160 may include one or more communications antennas. The one or more communications antennas may be any suitable type of antennas corresponding to, for example, the IEEE 802.11 communication standards. Examples of suitable communications antennas include Wi-Fi antennas, IEEE 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component(s) to transmit and/or receive signals, such as communications signals among the access point 150 and the vehicle 160.

The access point 150 and the vehicle 160 may be configured to perform directional transmission and/or directional reception in conjunction with wirelessly communicating in a wireless network. Such directional transmission and/or reception can be performed using a set of multiple antenna arrays (e.g., DMG antenna arrays or the like). Each of the multiple antenna arrays may be used for transmission and/or reception in a particular respective direction or range of directions. The access point 150 and the vehicle 160 be configured to perform any given directional transmission a) towards one or more defined transmit sectors and/or b) from one or more defined receive sectors. Additionally, MIMO beamforming in the connected vehicle system 140 may be accomplished using radio frequency (RF) beamforming and/or digital beamforming. In particular, the access point 150 and the vehicle 160 may be configured to use all or a subset of its one or more communications antennas to perform MIMO beamforming.

The access point 150 and the vehicle 160 may include any suitable radio component(s) for transmitting and/or receiving RF signals in a bandwidth and/or channel corresponding to the communications protocols utilized by the access point 150 and the vehicle 160. The radio component(s) may include hardware and/or software to modulate and/or demodulate communications signals according to pre-established transmission protocols. The radio component(s) may further have hardware and/or software instructions to communicate via one or more IEEE 802.11 communication standards. For example, the radio component(s), in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), 60 GHz channels (e.g. 802.11ad, 802.11ay), millimeter wave (mmWave) channels (e.g., 30-300 GHz), or 5G New Radio (NR). In another example, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component(s) may include any known receiver and baseband suitable for communicating via the communications protocols. Further, the radio component(s) may include a low noise amplifier (LNA), additional signal amplifiers, an analog-to-digital (A/D) converter, one or more buffers, and digital baseband.

As would be appreciated, vehicle 160 may comprise its own local network, to allow the various components of vehicle 160 to communicate with one another. For example, vehicle 160 may comprise a controller area network (CAN) bus, IP network, or the like, to allow the various systems of vehicle 160 to communicate with one another. Such system may include, but are not limited to, an engine control unit (ECU), a battery management system (BMS) that manages the local battery of vehicle 160, if vehicle 160 is an electric vehicle, processors controlling vehicle body functions, and the like. A local gateway of vehicle 160 may provide communicative connectivity between the local network of vehicle 160 and other devices.

Figure 2:
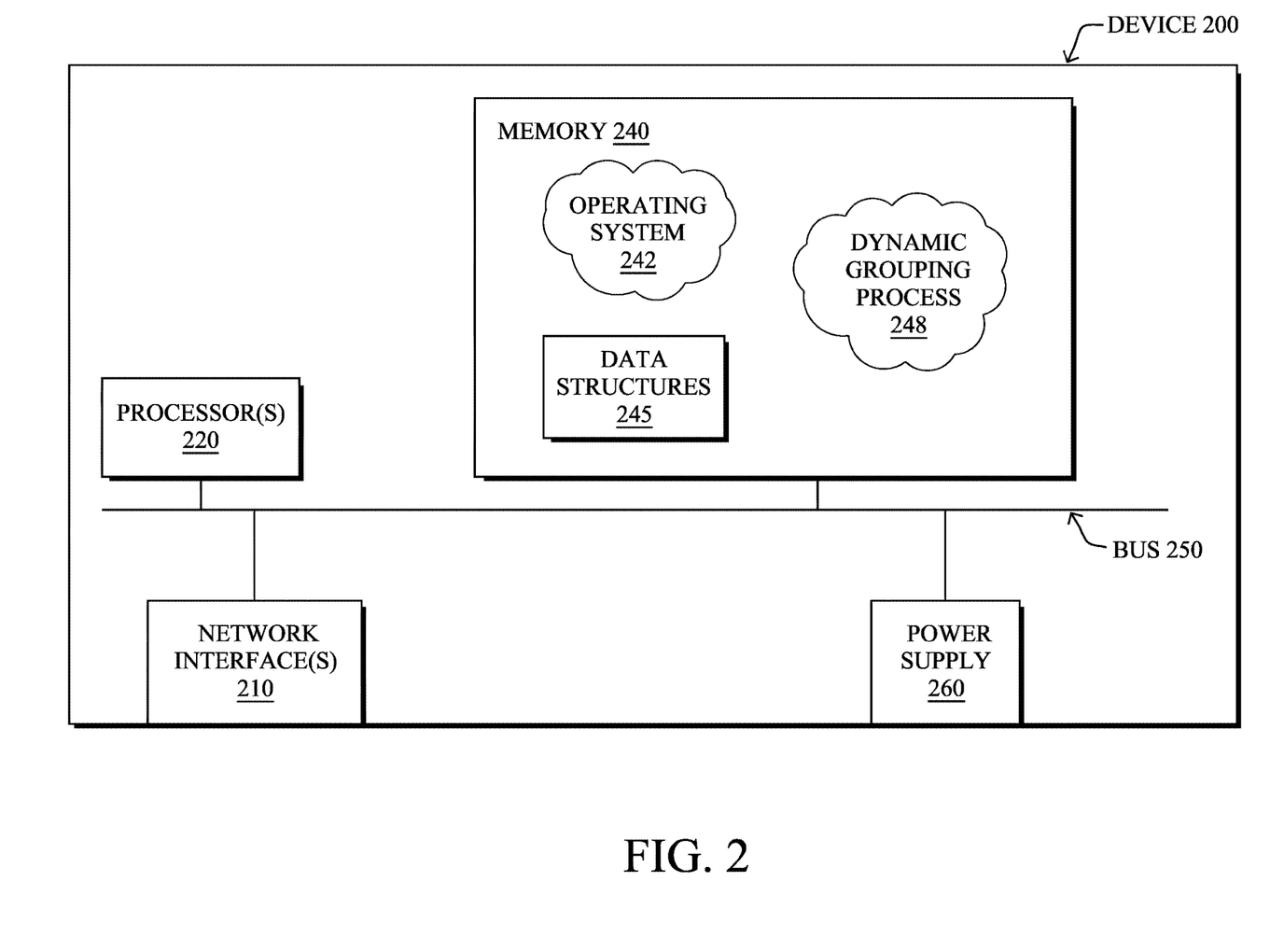
FIG. 2 illustrates an example network device/node.

FIG. 2 is a schematic block diagram of an example computing device/node (e.g., apparatus) 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for fog modules using PLC, the network interface 210 may communicate through the power supply 260 or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative dynamic grouping process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes, or operate concurrently.

As noted above, connected vehicles and smart cities enable communication between vehicles and existing computer networks (V2X). V2X communication enables, for example, travel assistance by using conventional communication standards (e.g., DSRC). V2X environments have experienced an exponential growth in the data volume (e.g., file sizes of high-definition maps, media, etc.) that is transmitted between on vehicles and infrastructure. In addition to complementing conventional longer range but lower throughput communication mechanisms, high-throughput connection points, like mmWave-compatible hardware, has become used to provide the high-throughput required for the large data volume.

In situations involving fast moving vehicles communicating with computer network infrastructure, challenges arise when implementing the high-throughput connection points. In particular, a single fast-moving vehicle may not be able to receive all the data the vehicle requires from a high-throughput connection point (e.g., an access point) due to the transient nature of the vehicle (e.g., moving by the access point in a short amount of time, having line of sight (LOS) interruptions, etc.). Grouping fast-moving vehicles may resolve this problem by ensuring that the total volume of data delivered to a group of vehicles is the sum of all data delivered to, and needed by, each vehicle in the group of vehicles. Creating such groups of vehicles (e.g., vehicles traveling as part of a convoy like long haul tractor trailers), however, is complex given the dynamic environments V2X occurs in (e.g., multiplicity of vehicles with different communication needs, the aforementioned transient nature of vehicles, etc.).

—Mobile Data Dynamic Grouping for Connected Vehicle and In-Vehicle Networking—

To address the environmental difficulties of connected vehicle and in-vehicle network as noted above, the techniques herein establish a new communication system for information sharing among dynamically grouped vehicles. Notably, a dynamic grouping mechanism may allow fast moving vehicles (e.g. cars, trucks, etc.) that transiently pass by connection points (e.g. a high-throughput radio connection points or access point at an overpass) to form structured or opportunistic groups in order to distribute or share information (e.g., information from the Internet, large media files, etc.) exchanged through the high-throughput connection. By facilitating data exchange between individual vehicles in a group, the grouping of a plurality of vehicles (e.g., a convoy) allows for high-volume data flows to extend the reach of the high-throughput data flows beyond the limits of the temporal connection point cell (e.g., access point).

Specifically, according to one or more embodiments of the disclosure as described in detail below, information sharing among dynamically grouped vehicles may illustratively comprise making, by a first vehicle of a first plurality of vehicles, a determination that the first plurality of vehicles is a convoy of vehicles traveling as a group; sending, by the first vehicle, a group identifier that is indicative of the convoy and of each of the plurality of vehicles to an access point in communication with the first vehicle; authenticating, by the first vehicle, with the access point using the group identifier; and exchanging, by the first vehicle, first vehicular data with the access point using a first connection of a plurality of connections assigned to the group identifier.

Illustratively, the techniques described herein may be performed by hardware, software, and/or firmware, such as in accordance with the dynamic grouping process 248, which may include computer executable instructions executed by the processor 220 (or independent processor of interfaces 210) to perform functions relating to the techniques described herein, e.g., in conjunction with routing process 244.

Figure 3A:
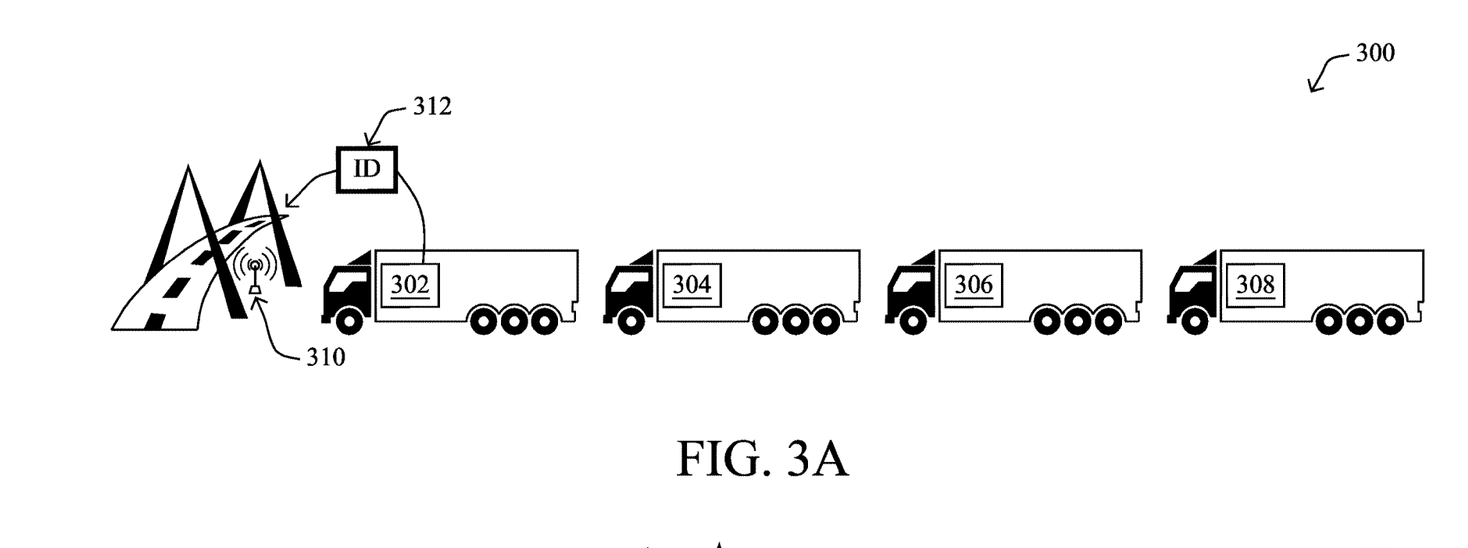
FIGS. 3A-3B illustrate an example system for information sharing among dynamically grouped vehicles.
Figure 3B:
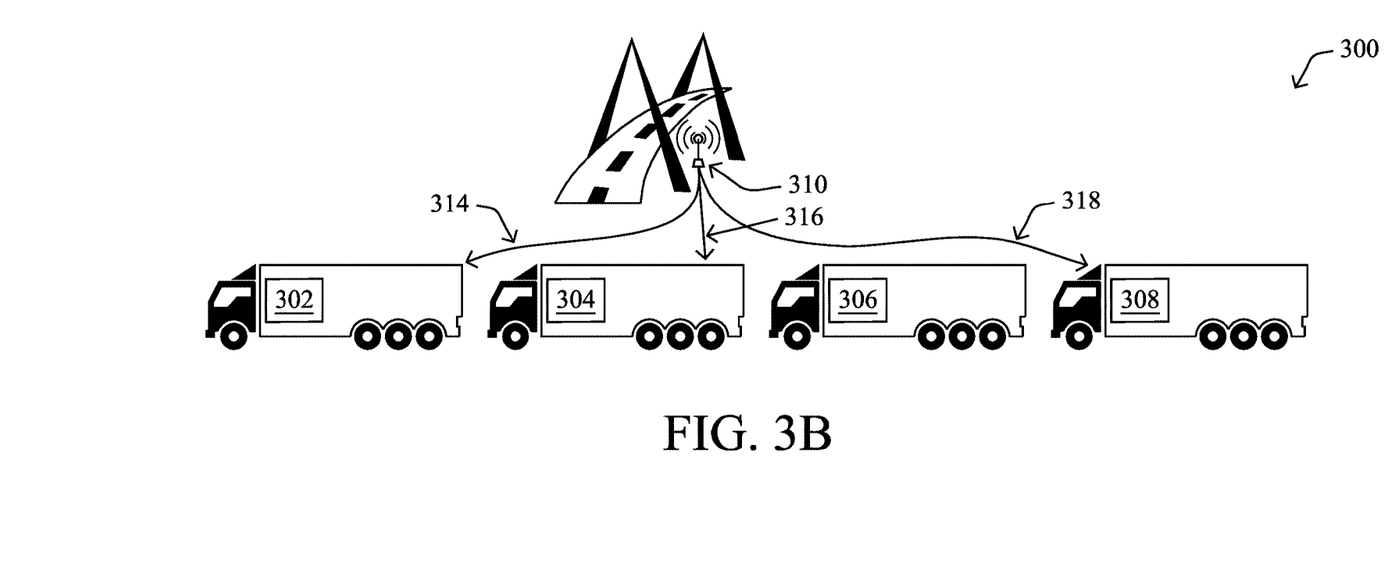

Operationally, with reference now to FIGS. 3A-3B, a system 300 for information sharing among dynamically grouped vehicles is shown. With reference to FIG. 3A, the system may comprise vehicles 302-308 and an access point 310 (which may be described herein as a "high-throughput connection point"). Generally, the vehicles 302-308 may be a defined, cohesive, and compact group (e.g., truck platooning) such that the vehicles 302-308 are within communication range among one another. For example, the vehicles 302-308 may be traveling at approximately the same speed and in the same direction along a highway. The access point 310 may include mmWave-compatible hardware (60 GHz 802.11ad/ay, 5G NR, etc.) and/or software that allows the access point 310 to form wireless connections with communications hardware on each of the vehicles 302-308.

As shown in FIG. 3A, a first vehicle 302 may determine that it is in convoy with the other vehicles 304-308. The first vehicle 302, when it is the first vehicle to associate with the access point 310 may send a group identifier 312 to the access point 310, where group identifier is indicative of the convoy and of each of the vehicles 302-308. The first vehicle may also authenticate with the access point 310 using the group identifier 312. The access point 310 may assign a plurality of connections, resources, or the like to the group identifier 312 that is indicative of the convoy. The first vehicle 302 may exchange vehicular data, for example, high-volume data like entertainment, high-definition maps for self-driving cars, local machine learning (ML) logic updates, detailed analytics about engine performance, software/firmware, etc. with the access point 310. The group identifier 312 may be, for example, a media access control (MAC) address, an internet protocol (IP) address, an information centric networking (ICN) label, or a named data networking (NDN) label.

Notably, and as shown in FIG. 3B, the access point 310 may assign the vehicles 302-308 a single virtual MAC address or IP address that is shared among the vehicles 302-308. The virtual MAC address may act as a hierarchical structure, consisting of a group/convoy identity, and individual vehicular identities (e.g., the vehicles 302-308). Stated in another way, the convoy may be treated as a single client by the access point 310, where the client performs multiple connections at various data rates and signal levels (with the multiple connections 314-318 allocated to the vehicles 302-308). Further, after the authentication between the first vehicle 302 and the access point 310, the first vehicle 302 may share its authentication credentials with the other vehicles 304-308 over a secure connection (e.g., DSRC) so that the other vehicles 304-308 can use the authentication credentials to form some of the multiple connections. For example, the authentication credentials may be sent from the first vehicle 302 to the second vehicle 304, then the second vehicle 304 may send the authentication credentials to a third vehicle 306. Alternatively, each of the other vehicles 304-308 may authenticate with the access point 310 when they are in communication range with the access point 310.

With more detail regarding the exchange of vehicular data, the vehicular data can be delivered to any single vehicle in the convoy at any given time as they drive past the access point 310. The vehicles may be configured to forward data on to a vehicle in the convoy, even after a connection to between the access point 210 and the forwarded vehicle AP has ended (e.g., if there was a lot of data to forward onto the first vehicle from the end vehicles). Vehicles 302-308 of the convoy can implement group encryption as well as individual vehicle P2P encryption, so such a forwarding scheme can be secure. Similarly, for uplink of vehicular data, a similar scheme can be designed. In particular, a vehicle can forward data to another vehicle such that the data is sent to the access point 310 over a connection between the other vehicle and the access point 310.

The access point 310, in another embodiment, may assign each vehicle of the vehicles 302-308 individual MAC addresses and/or IP address, where external mechanisms (e.g., ranging, GPS location, etc.) may allow the vehicles 302-308 in the convoy to determine their position in the convoy such as first, second, or last. It should be noted that the vehicle position may not need to be linear or reflective of a physical order of the vehicles 302-308. For example, vehicles may pass one another, fading may render communication to one of the vehicles difficult (e.g., vehicle skipped), or the access point 310 may be in range of more than one vehicle at a time. The access point 310 may use the order of the vehicles 302-308 to send elements of the same shared data content to more than one vehicle, but the access point 310 is not limited by the order of the vehicles 302-308 with respect to how data is sent.

Further, the first vehicle 302 may be configured to include, or transmit along with, a "continue to next vehicle" flag in the group identifier 312 to the access point 310. Using the continue to next vehicle flag, the access point 310 may determine whether to continue treating connections with vehicles that follow the first vehicle 302 as part of the convoy. For example, the flag may be a one-bit value that indicates whether to do so. In addition, the continue to next vehicle flag may be accompanied by a temporal value that indicates a duration of how long the continue to next flag is to be valid. If none of the vehicles 304-308 of the convoy establishes a connection within the time range after the first vehicle transmits the continue to next vehicle flag and temporal value, the continue to next vehicle flag expires. In another embodiment, the validity of the continue to next vehicle flag is determined by the access point 310 based on, for example, a general timer, internal conditions (e.g., buffer characteristics), estimated speeds of the vehicles 302-308, or a data criticality flag (as will be described in greater detail herein below).

The vehicles 302-308 of the convoy may be part of a mesh network (e.g., an internal convoy LAN). The mesh network may provide mechanisms for each vehicle to determine proximities, identities, etc. of other vehicles of the convoy. The first vehicle 302, for example, can make a determination that it is part of the convoy by using the information provided by the mesh network. Further, the vehicles 302-308 can each can send the identities of all convoy members (e.g., vehicles 302-308) to the access point 310 during respective associations with the access point 310.

Figure 4A:
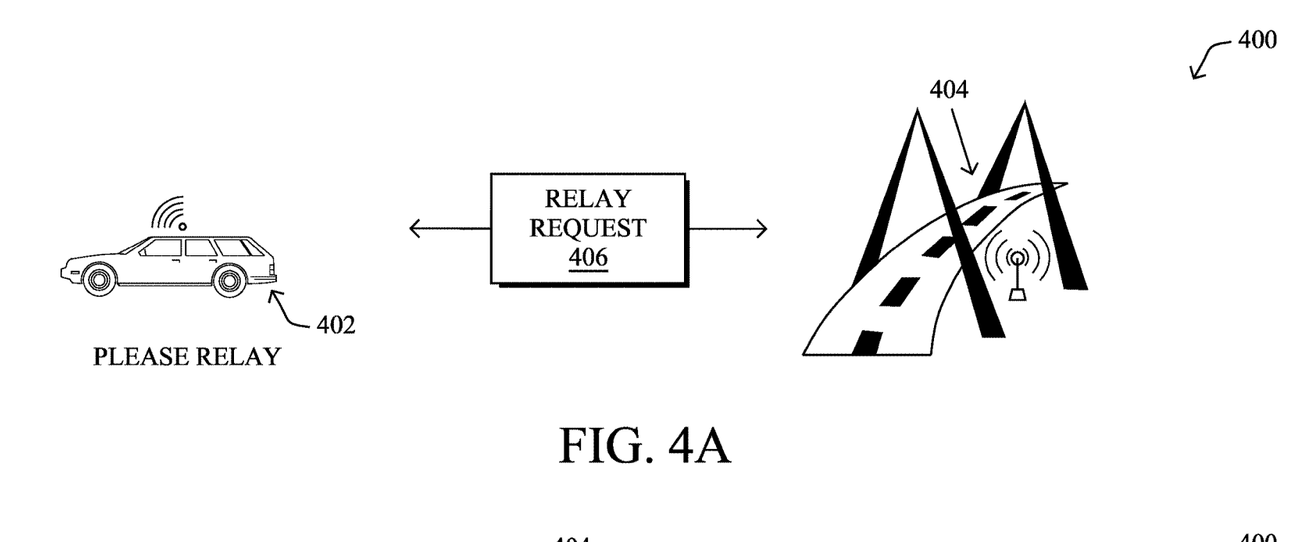
FIGS. 4A-4C illustrate an example system for information sharing among dynamically grouped vehicles using a relay request.
Figure 4B:
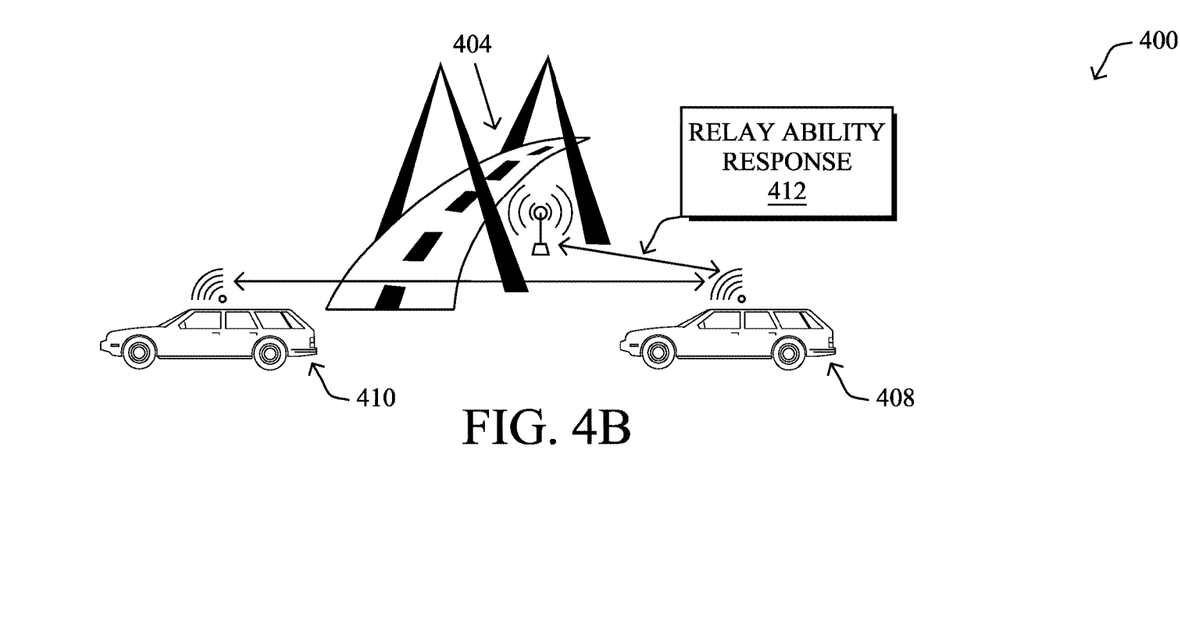
Figure 4C:
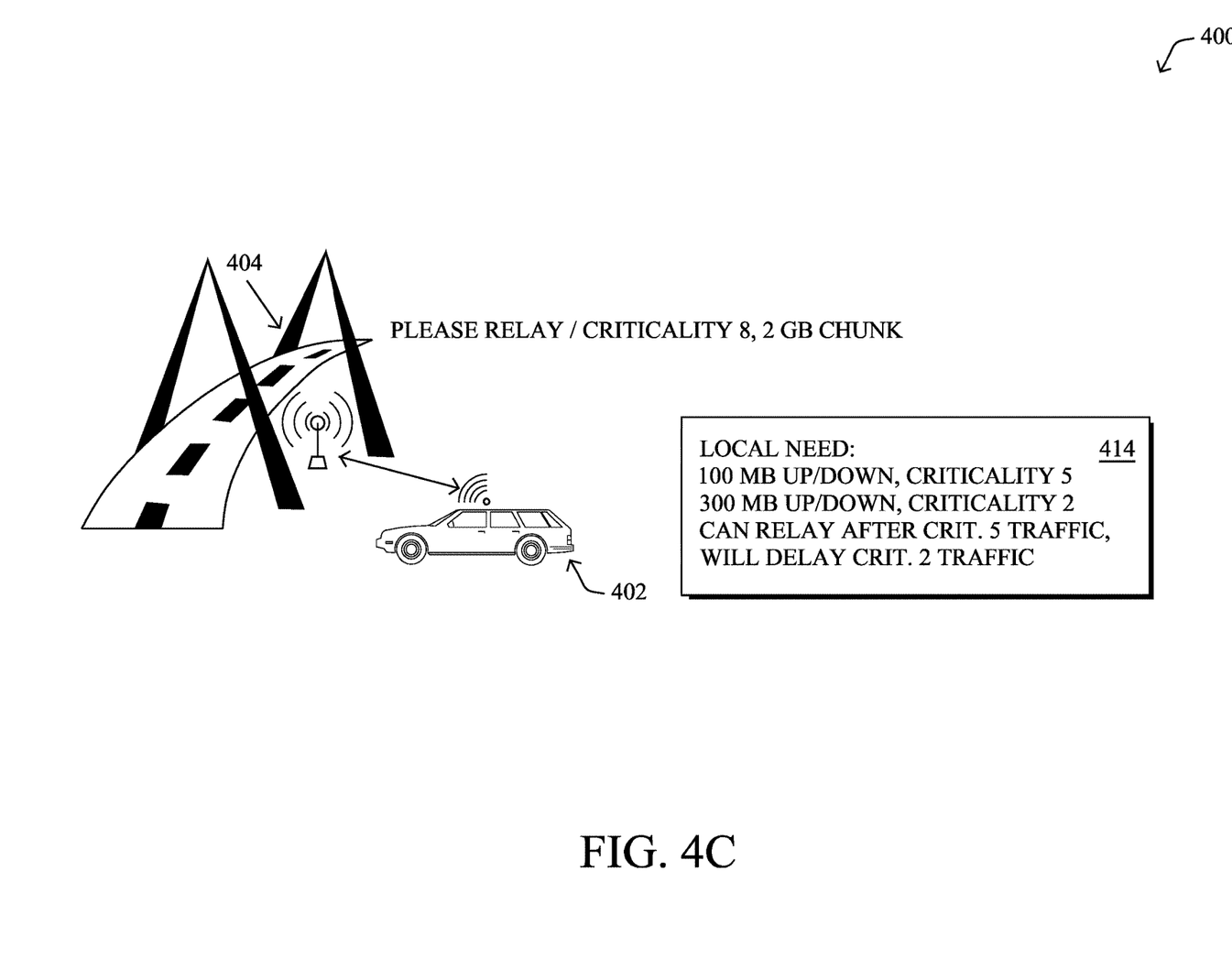

With reference now to FIGS. 4A-4C, a system 400 for information sharing among dynamically grouped vehicles using a relay request is shown. A first vehicle 402 that is part of a convoy (e.g., a plurality of vehicles) may associate with an access point 404. The first vehicle 402 may identify communication degradation with the access point 404 that interrupts an exchange of data between the first vehicle 402 and the access point 404. The degradation may be, for example, loss of connectivity due to distance between the first vehicle 402 and the access point 404, diminished channel conditions affecting the exchange, etc. The first vehicle 402 may determine that a connection being used to transfer high-volume data with the access point 404 has degraded to a point where the connection cannot be maintained so as to exchange the entire content of the high-volume data. In an example, a simplified signal degradation over communication throughput may be used by the first vehicle 402 to make such determination. After identifying the communication degradation, the first vehicle may transmit a relay request 406 to the access point 404, where the relay request 406 may trigger the access point 404 to determine whether other vehicles that are part of a convoy of the first vehicle 404 can relay the high-volume data to the first vehicle 404. In one embodiment, the first vehicle 402 (e.g. at the beginning of a communication session with the access point 404) may indicate the identities of vehicles in its convoy that may share and/or relay content in the group.

Turning to FIG. 4B, the access point 404, to determine whether other vehicles 408-410 can relay the high-volume data to the first vehicle 404, may send a relay ability request to each of the other vehicles 408-410, where the relay ability request causes a vehicle in a convoy to indicate whether it can relay the high-volume data. Subsequent to receiving a relay ability request, a second vehicle 408 may examine its own resource allocation (e.g., transmission budget, reception budget, etc.) with the access point 404 and compare the resource allocation to amount of data required to complete the exchange of data (between the first vehicle 402 and the access point 404). Based on the comparison, the second vehicle 408 may send a relay ability response 412 that includes an indication of one of the following:

a "cannot relay" indication that indicates the second vehicle 402 cannot (or opts out of assisting to) relay data traffic for the first vehicle 402 as requested;

a "can relay past the access point" indication that indicates that the second vehicle 408 (a) intends to use its resource allocation with the access point 404 for its own data and does not wish to immediately relay data traffic for the first vehicle 402 and (b) has available bandwidth that can be borrowed to relay traffic to the first vehicle 402 once the second vehicle 408 is no longer in range of the access point 404 (The can relay past the access point indication may additionally include a timeout or max range value that indicates an amount of time or distance past the access point 404 that this can relay past the access point indication is valid. The time out or max range value ensures that the offer expires before the convoy is in proximity to another access point.); or a "can relay within and past the access point" indication that indicates that the second vehicle 408 has transmission budget to relay traffic for the first vehicle 402 both within range of the access point and after. (The can relay within and past the access point indication may have validity limitations such as, in time, distance, geolocation boundary, or volume of data.)

Subsequent to receiving the relay ability response 412, the access point 404 may control the second vehicle 408 to complete the exchange of data between the first vehicle 402 and the access point 402 (based on the indication included in the relay ability response 412). It is to be understood that a volume of data that the second vehicle 408 is to relay can be controlled by, for example, a data feed server in communication with the access point 404. The data feed server can determine the volume of data based on on the size of the in complete exchange between the first vehicle 402 and the access point 404 and the estimated time and/or distance to a next access point. In another embodiment, the determination is made by the second vehicle 408 (based on data criticality and/or distance to a next access point). Furthermore, the access point 404 may on its own determine whether the relay request 406 has been fulfilled or cannot be fulfilled. In particular, this determination may be made on criteria, such as attempts (successful or not) to establish communication with a predetermined number of vehicles, time since the relay request 406 (combined or not with an estimation of an average passing vehicles speed) was received, out of band exchange with content/data feed serve, etc. In cases where the relay request 406 cannot be fulfilled, the access point 404 may age out and ignore the relay request 406 received from the first vehicle.

Turning to FIG. 4C, additional features of the relay request are shown. In particular, the relay request 406 may include a criticality index. In one embodiment, the criticality index 414 can be an emergency flag. In another embodiment, the criticality index 414, as shown, can take a range of values to express the relative criticality of the traffic requested for the requesting vehicle (e.g., the first vehicle 402). This criticality index can be expressed to subsequent vehicles (e.g., the other vehicles 408-10) that can compare that index value to the criticality of their own traffic. It is to be understood that the mapping need not be linear. For example, if the criticality is an index from 0 to 10, where 10 is indicative of the highest criticality, a subsequent vehicle (e.g., the second vehicle) may decide to relay data that satisfies certain criteria for the criticality index. For example, the second vehicle 408 may only relay traffic for first vehicle 402 if the requested relay traffic of first vehicle 402 is at least 3 points higher than the criticality index of the second vehicle 408 (e.g., with a percentage of airtime that can be proportional to the relative criticality comparison between the asking and subsequent vehicle traffic criticality mix).

It is to be understood the system 400 described herein above, while described for half duplex transmissions, may be implemented with full-duplex radio transmissions. In such scenarios, vehicles (e.g., the first vehicle 402) may be able to simultaneously upload data for itself and download data for another vehicle at the same time. Likewise, vehicles may simultaneously download data from the access point 404 and relay that data to another vehicle at the same time. In addition, the access point 404 may simultaneously communicate with more than one vehicle within a group or convoy (e.g., when the vehicles are trucks that are close to or next to each other, in adjacent lanes, etc.). Multiples access points may additionally service a single convoy, for example, when a convoy length is comparable to or greater than the spacing between access points. In such scenarios, simultaneous flows can be exchanged with the APs and vehicles of the single convoy.

Figure 5:
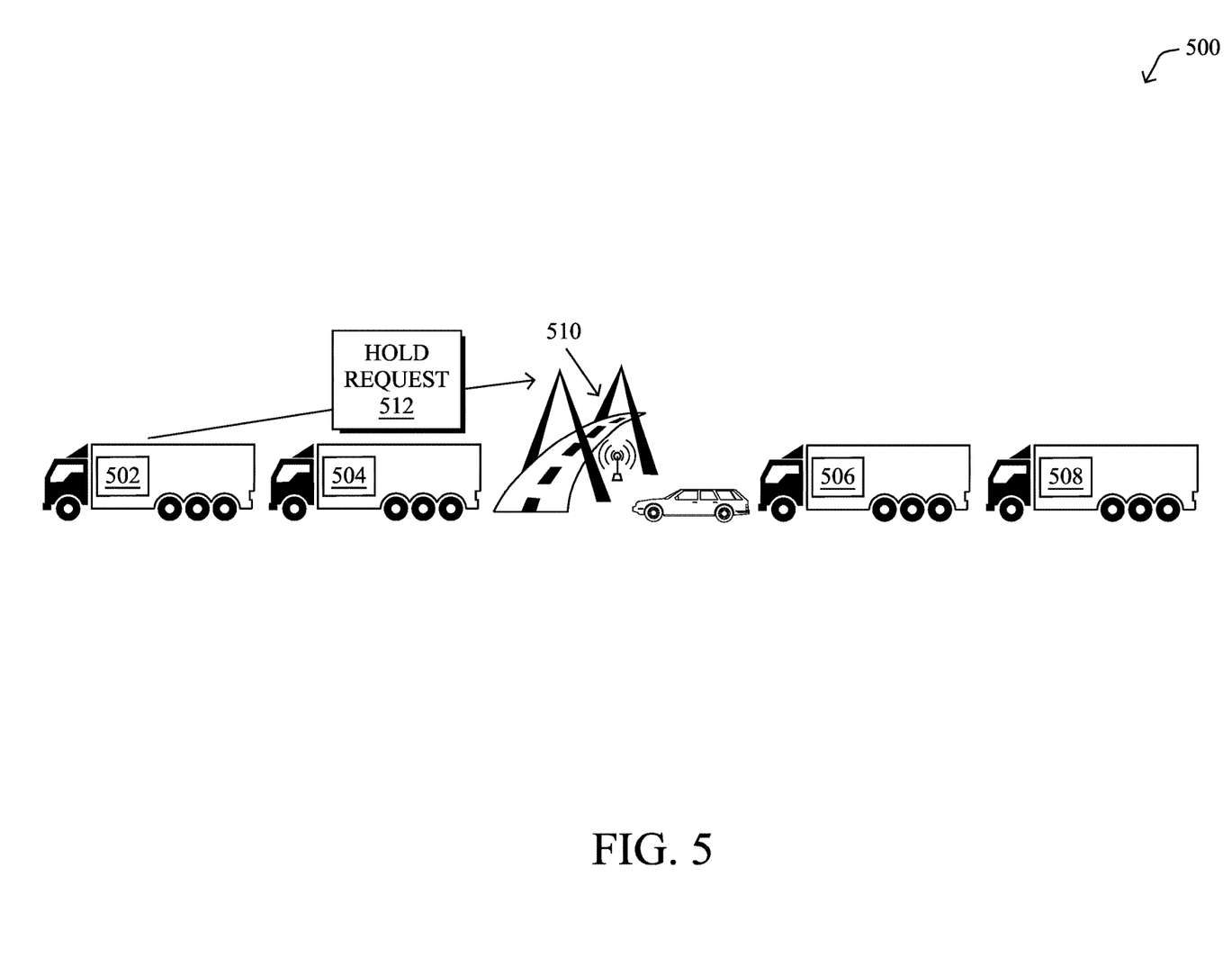
FIG. 5 illustrates an example system for information sharing among opportunistically grouped vehicles.

With reference now to FIG. 5, a system 500 for information sharing among opportunistically grouped vehicles is shown. In particular, the system 500 may include vehicles 502-508 that are related to one another in that the vehicles 502-508 may require the same type of vehicular data (e.g., a firmware update, software update, safety warning, etc.). As examples, the vehicles 502-508 may be the same brand and mode (e.g., requiring the same update), headed toward the same destination along the same road (e.g., as autonomous vehicles, as individually owned by a family or friends, etc.), or tasked for the same mission (e.g., buses, emergency vehicles etc.). Each of the vehicles 502-508 may associate with an access point 510 at temporally different types along a path (e.g., a road). The access point 512 may be in communication with a data feed server that can, after identifying transmission of data (e.g., an update) that is to be pushed to a first vehicle 502, estimate that other vehicles 504-508 are going to need the same transmission of data. In such scenarios, the data feed server can instruct the access point 510 to temporarily retain the information. In lieu of the data feed server, the first vehicle 402 may determine to make information available to other vehicles in a P2P fashion. In this mode, the vehicle queries group or identifier membership from nearby in-range vehicles. When a membership match is found, labels can be exchanged to further identify if one of the vehicles holds information that the other does not have yet (and would need).

Alternatively, the first vehicle 502 may send a hold request 512 to the access point 510 which indicates to the access point 510 that the access point 510 is to hold and retain a message that is to be directed to one of the other vehicles 504-508. The hold request 512 may include a label which identifies the relation of the first vehicle 502 with the other vehicles 504-508. As examples, the label may be inherent to the vehicles 502-508 identification or may be configured out of band. After receiving the hold request 512, the access point 510, the access point 510 may send the message to the directed vehicle (and the directed vehicle may additionally transmit another hold request 512). A flag can accompany the hold request 512 that indicates to the access point 510 how long the hold request 512 is to last. Furthermore, in some cases a group of vehicles may decide to have a shared key(s) associated with an encrypted version of the data. In this manner, only the vehicles in the group would be able to access the data.

Figure 6:
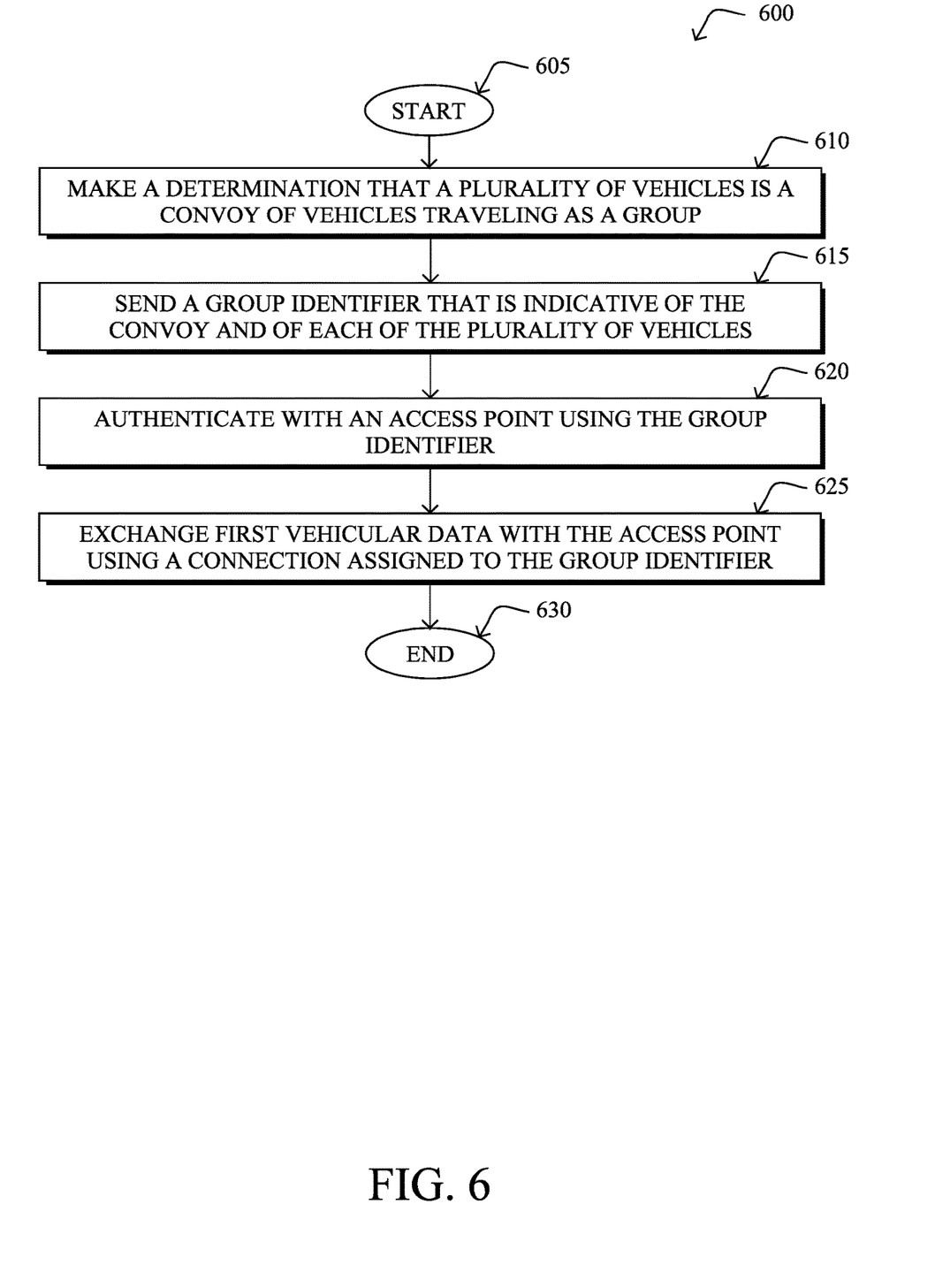
FIG. 6 illustrates an example simplified procedure for dynamically grouping vehicles for information sharing.

FIG. 6 illustrates an example simplified procedure for information sharing among dynamically grouped vehicles in accordance with one or more embodiments described herein. For example, one or more non-generic, specifically configured devices may perform procedure 600 by executing stored instructions (e.g., dynamic grouping process 248). The procedure may start at step 605, and continues to step 610, where, as described in greater detail above, a first vehicle of a first plurality of vehicles may make a determination that the first plurality of vehicles is a convoy of vehicles traveling as a group. The plurality of vehicles may be a defined, cohesive, and compact group (e.g., truck platooning) that are within communication range among one another (e.g., vehicles that are traveling at approximately the same speed and in the same direction along a highway). The access point may include mmWave-compatible hardware (60 GHz 802.11ad/ay, 5G NR, etc.) and/or software.

In step 615, the first vehicle may send a group identifier that is indicative of the convoy and of each of the plurality of vehicles to an access point in communication with the first vehicle. The group identifier may be a MAC address, an IP address, an ICN label, or an NDN label.

In step 620, the first vehicle may authenticate with the access point using the group identifier. The access point may assign a single virtual MAC address (or IP address) to the plurality of vehicles. The virtual MAC address may act as a hierarchical structure, consisting of a group/convoy identity and individual vehicular identities.

In step 625, the first vehicle may exchange first vehicular data with the access point using a first connection of a plurality of connections assigned to the group identifier. The first vehicular data may be high-volume data like entertainment, high-definition maps for self-driving cars, local machine learning (ML) logic updates, detailed analytics about engine performance, software/firmware, etc. The first vehicle may share its authentication credentials with the other vehicles over a secure connection (e.g., DSRC) so that the one or more of the plurality of vehicles form individual connections, under the virtual MAC address, with the access point.

The illustrative procedure 600 may then end in step 630.

It should be noted that certain steps within procedure 600 may be optional as described above, and the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for a dynamic grouping mechanism that allow fast moving vehicles that transiently pass by connection points to form structured or opportunistic groups in order to distribute or share information (e.g., information from the Internet, large media files, etc.) exchanged through the high-throughput connection. By facilitating data exchange between individual vehicles in a group, the grouping of a plurality of vehicles (e.g., a convoy) allows for high-volume data flows to extend the reach of the high-throughput data flows beyond the limits of the temporal connection point cell (e.g., access point).

While there have been shown and described illustrative embodiments that provide for information sharing among dynamically grouped vehicles, it is to be understood that various other adaptations and modifications may be made within the intention and scope of the embodiments herein. For example, while certain protocols are shown, such as 802.11 ay/ad, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intention and scope of the embodiments herein.

What is claimed is:

1. A method, comprising:
    making, by a first vehicle of a first plurality of vehicles, a determination that the first plurality of vehicles is a convoy of vehicles traveling as a group;
    sending, by the first vehicle, a group identifier that is indicative of the convoy and of each of the plurality of vehicles to an access point in communication with the first vehicle;
    authenticating, by the first vehicle, with the access point using the group identifier;
    exchanging, by the first vehicle, first vehicular data with the access point using a first connection of a plurality of connections assigned to the group identifier; and
    sending, by the first vehicle and in response to identifying communication degradation interrupting an exchange of data between the first vehicle and the access point, a relay request to the access point, wherein the relay request is indicative of request for relayed vehicular data to complete the exchange of data.

2. The method of claim 1, wherein the access point assigns a virtual media access control (MAC) address to the convoy of vehicles, the virtual MAC address associated with the plurality of connections and indicative of a hierarchal structure of the convoy of vehicles.

3. The method of claim 1, further comprising:
    sending, by the first vehicle, authentication credentials associated with the access point to a second vehicle of the plurality of vehicles using a secure connection; and
    exchanging, by the second vehicle, second vehicular data with the access point using a second connection of the plurality of connections.

4. The method of claim 1, further comprising:
    authenticating, by a second vehicle of the plurality of vehicles, with the access point using the group identifier; and
    exchanging, by the second vehicle, second vehicular data with the access point using a second connection of the plurality of connections.

5. The method of claim 1, wherein the group identifier is selected from a group consisting of: a media access control (MAC) address, an internet protocol (IP) address, an information centric networking (ICN) label, or a named data networking (NDN) label.

6. The method of claim 1, wherein the access point is a millimeter wave (mmWave) access point.

7. The method of claim 1, further comprising:
    identifying, by the first vehicle, the communication degradation; and
    receiving, by the first vehicle, the relayed vehicular data from a second vehicle of the plurality of vehicles, the relayed vehicular data completing the exchange of data.

8. The method of claim 7, wherein the relay request includes additional information that is selected from a group consisting of: a criticality index, an emergency flag, and a time flag.

9. The method of claim 1, further comprising:
    receiving, by the first vehicle, a relay ability request from the access point;
    sending, by the first vehicle, a relay ability response to the access point based on a transmission budget of the first vehicle; and
    sending, by the first vehicle, relayed vehicular data to a second vehicle of the plurality of vehicles, the relayed vehicular data completing an exchange of data between the second vehicle and the access point that is interrupted by communication degradation.

10. The method of claim 9, wherein the relay ability response includes ability information that is selected from the group consisting of a cannot relay ability flag, a can relay beyond AP flag, or a can relay flag.

11. An apparatus, comprising:
    one or more network interfaces to communicate with a network;
    a processor coupled to the network interfaces and configured to execute one or more processes; and
    a memory configured to store a process executable by the processor, the process when executed operable to:
        make a determination that a first plurality of vehicles is a convoy of vehicles traveling as a group;
        send a group identifier that is indicative of the convoy and of each of the plurality of vehicles to an access point in communication with a first vehicle;
        authenticate the first vehicle with the access point using the group identifier;
        exchange first vehicular data with the access point using a first connection of a plurality of connections assigned to the group identifier; and
        send, in response to identifying communication degradation interrupting an exchange of data between the first vehicle and the access point, a relay request to the access point, wherein the relay request is indicative of request for relayed vehicular data to complete the exchange of data.

12. The apparatus of claim 11, wherein the access point assigns a virtual media access control (MAC) address to the convoy of vehicles, the virtual MAC address associated with the plurality of connections and indicative of a hierarchal structure of the convoy of vehicles.

13. The apparatus of claim 11, the process when executed further operable to:
    send authentication credentials associated with the access point to a second vehicle of the plurality of vehicles using a secure connection, wherein the second vehicle exchanges second vehicular data with the access point using a second connection of the plurality of connections.

14. The apparatus of claim 11, wherein the group identifier is selected from a group consisting of: a media access control (MAC) address, an internet protocol (IP) address, an information centric networking (ICN) label, and a named data networking (NDN) label.

15. The apparatus of claim 11, wherein the access point is a millimeter wave (mmWave) access point.

16. A tangible, non-transitory, computer-readable medium storing program instructions that cause a device in a network to execute a process comprising:
    making, by a first vehicle of a first plurality of vehicles, a determination that the first plurality of vehicles is a convoy of vehicles traveling as a group;
    sending, by the first vehicle, a group identifier that is indicative of the convoy and of each of the plurality of vehicles to an access point in communication with the first vehicle;
    authenticating, by the first vehicle, with the access point using the group identifier;
    exchanging, by the first vehicle, first vehicular data with the access point using a first connection of a plurality of connections assigned to the group identifier; and
    sending, by the first vehicle and in response to identifying communication degradation interrupting an exchange of data between the first vehicle and the access point, a relay request to the access point, wherein the relay request is indicative of request for relayed vehicular data to complete the exchange of data.

17. The tangible, non-transitory, computer-readable medium of claim 16, wherein the access point assigns a virtual media access control (MAC) address to the convoy of vehicles, the virtual MAC address associated with the plurality of connections and indicative of a hierarchal structure of the convoy of vehicles.

18. The tangible, non-transitory, computer-readable medium of claim 16, the process further comprising:
   sending, by the first vehicle, authentication credentials associated with the access point to a second vehicle of the plurality of vehicles using a secure connection, wherein the second vehicle exchanges second vehicular data with the access point using a second connection of the plurality of connections.

19. The tangible, non-transitory, computer-readable medium of claim 16, wherein the group identifier is selected from a group consisting of: a media access control (MAC) address, an internet protocol (IP) address, an information centric networking (ICN) label, and a named data networking (NDN) label.

20. The tangible, non-transitory, computer-readable medium of claim 16, wherein the access point is a millimeter wave (mmWave) access point.

\* \* \* \* \*